United States Patent
Hill et al.

(10) Patent No.: US 8,081,190 B2
(45) Date of Patent: Dec. 20, 2011

(54) SYSTEM AND METHOD FOR OPTIMIZING A GRAPHICS INTENSIVE SOFTWARE PROGRAM FOR THE USER'S GRAPHICS HARDWARE

(75) Inventors: Ryan Hill, Cupertino, CA (US); Imran Qureshi, Sunnyvale, CA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 12/766,870

(22) Filed: Apr. 24, 2010

(65) Prior Publication Data

US 2010/0201695 A1   Aug. 12, 2010

Related U.S. Application Data (63) Continuation of application No. 11/469,894, filed on Sep. 4, 2006, now Pat. No. 7,742,050, which is a continuation of application No. 10/957,965, filed on Oct. 4, 2004, now Pat. No. 7,164,419.

(51) Int. Cl.
*G06F 15/16*  (2006.01)
*G06T 1/00*  (2006.01)
*G09G 5/02*  (2006.01)
*G09G 5/00*  (2006.01)

(52) U.S. Cl. ......... 345/503; 345/522; 345/594; 345/650

(58) Field of Classification Search .................. 345/419, 345/422, 501, 543, 548, 591–594, 613, 614, 345/661, 522, 650; 719/323, 324, 327; 710/10, 301

See application file for complete search history.

(56) References Cited

U.S. PATENT DOCUMENTS 6,304,244 B1 * 10/2001 Hawkins et al. .............. 345/502
6,831,652 B1 * 12/2004 Orr ................................ 345/543

* cited by examiner

*Primary Examiner* — Hau Nguyen (74) *Attorney, Agent, or Firm* — Lyon & Harr, LLP; Katrina A. Lyon (57) ABSTRACT

A system and method for optimizing the performance of a graphics intensive software program for graphics acceleration hardware. This system and method encompasses a procedure that validates the different functions of a 3D acceleration capable video card, decides whether to use the acceleration hardware and optimizes the software application to selectively use the functions that work on the specific video acceleration card. Functions checked include sub-pixel positioning, opacity, color replacement and fog. If these tests are successful, then the graphics acceleration is used by the software application. However, if the tests are not successful the decision is made not to use graphics accelerator. Those with ordinary skill in the art will realize that it is not necessary to perform all of the tests in a specific order. Additionally, other types of tests could be performed to ensure software application and video card compatibility before the software application is uses graphics acceleration to render 3D graphics.

20 Claims, 9 Drawing Sheets

SYSTEM AND METHOD FOR OPTIMIZING A GRAPHICS INTENSIVE SOFTWARE PROGRAM FOR THE USER'S GRAPHICS HARDWARE

This is a continuation of prior application Ser. No. 11/469,894, filed on Sep. 4, 2006, now U.S. Pat. No. 7,742,050 which is a continuation of prior application Ser. No. 10/957,965 entitled System and Method for Optimizing a Graphics Intensive Software Program for the User's Graphics Hardware filed Oct. 4, 2004 now U.S. Pat. No. 7,164,419.

BACKGROUND OF THE INVENTION

1. Technical Field

The invention is related to a system and method for optimizing a graphics intensive software program for a user's computer graphics hardware. Examples of such graphics-intensive programs include flight simulations, computer aided design programs, photo-editing programs, computer games, and clear type and presentation software.

2. Background Art

Due to advances in graphical operating systems and 3D computing, there has been an enormous increase both in how much data is sent to computer monitors and the sophisticated calculations that must be done to determine what is seen on the screen. As a result, computer video cards have evolved to be much more like co-processors. The video card in a personal computer plays a significant role in the following important aspects of the personal computer system:

Performance: The video card is one of the components that has an impact on system performance. For example, application software that depends on a high frame rate (how many times per second the screen is updated with new information) for smooth animation, is often impacted far more by the choice of video card than by the choice of system Central Processing Unit (CPU).

Software Support: Certain programs, such as, in particular, video games and other graphics programs, require support from the video card. Some programs, such as 3D-enhanced games, will not run at all on a video card that does not support them.

Reliability and Stability: Choosing the wrong video card can cause problematic system behavior, such as computer system crashes and hangs. In particular, some cards or types of cards are notorious for having unstable drivers, which can cause a host of difficulties.

Because the computer screen is two-dimensional (2D), everything that a personal computer displays must be two-dimensional as well. In order for the computer monitor to display three-dimensional (3D) objects, it is necessary for them to be converted to 2D images. This requires special processing and a large amount of computing power. The push for more realism, more detailed graphics, and faster speeds in such programs as action games, flight simulators, graphics programs, computer aided design (CAD) applications and presentation software, means that more 3D work must be done in a shorter period of time, requiring the use of specialized 3D accelerators. To perform the large amount of computation work necessary to translate 3D images to 2D in a realistic manner, accelerators were designed that did much of this work with specialized hardware, instead of forcing the system processor to do it. Using a 3D accelerator allows programs to display virtual 3D worlds or 3D objects with a level of detail and color that is impossible with a standard 2D video card. Common 3D operations wherein 3D accelerators are used include:

Gourad Shading: This is an algorithm that is used to give 3D surfaces realistic shading. The effect helps the object appear to have depth and helps to define the shape better.

Clipping: This operation determines what part of an object is visible on the screen and "clips out" any part that the user cannot see. Parts of objects that are off-screen are ignored, thereby improving system performance because the off-screen portions do not have to be computed for rendering.

Lighting: Objects in the real world have their appearance shaped by the light sources in the scene. Lighting effects cause color shading, light reflection, shadows and other effects to be added to objects based on their position and the position of light sources in the room.

Transparency/Opacity: Objects in the real world are transparent, semi-transparent or opaque. These transparency/opacity features are emulated in software/hardware.

Texture Mapping: For realistic objects, it is necessary to overlay pictures on them to give them texture. Texture mapping allows objects to be made so that they appear to have substance instead of being "flat". There are several different types of texture mapping that are used by various software and hardware.

Dithering: This is an effect that is actually used in many different places, including regular 2D graphics and also in printing. Dithering is the process of mixing a small number of colors together in specific patterns to create the illusion of there being a larger number of colors. In 3D, it is used largely to show more realistic color without needing to increase the color depth of the image (which means more computation time and more memory to store the graphics). Dithering takes advantage of the eye's tendency to blur spots of different colors by averaging their effects and merging them into a single perceived shade or color.

Fogging: Fogging serves two purposes by blurring objects that are in the distance. First, it helps to make the scene appear more realistic. Second, fogging allows the 3D process to be performed more quickly because those objects in the distance that are "fogged out" can be computed more quickly since they are shown in less detail.

Filtering: There are several types of filtering that can be applied to an image. These are used to "clean up" the image and smooth out textures and shapes. In particular, bilinear filtering is used when showing textures up close to remove the "blocky" look that results from magnifying an object when showing it at the front of a scene. Bilinear filtering refers to a process where the graphics hardware smooths the appearance of a texture by interpolating from one pixel value to the next. Textures appear perfectly smooth, even if viewed from very close, thanks to bilinear filtering.

In order to benefit from 3D acceleration features, it is necessary for software to know about them and support them. Unfortunately, with 3D being a relatively new field, a whole new breed of different and incompatible video cards has hit the market. Different cards have different capabilities. Additionally, different cards will behave differently—that is, the same instructions given to various video cards can yield different results. Support for a particular card is required from a program if it is to take advantage of the 3D card's features. Otherwise, the program will not benefit much (or at all) from the 3D hardware. Most of the specific support for 3D hardware is from games. This comes usually in the form of special versions that have been tailored to different video cards. In addition to a regular version of a popular game, a version may be created by a company to support a particular 3D chipset. This version will usually either have much superior graphics, faster performance, or both. However, it typically will not work with a different type of 3D card. Fortunately, new standard libraries are being developed to tackle this problem. Driver libraries like Microsoft Corporation's Direct3D® and OpenGL are designed to allow software to be written generically without tailoring them to each 3D chipset on the market, allowing them to be used regardless of what chipset is used. Software applications that are designed to use these libraries can avoid some of the need for customization.

Many applications employ 3D graphics and 3D accelerators, as well as driver libraries such as Direct3D®, to improve the performance and reliability of the application software. One such application, for example, is presentation software, such as Microsoft Corporation's PowerPoint®. PowerPoint® has a capability of providing a "slideshow" feature wherein a presenter can present a presentation in slide form to an audience using a computer.

Customers desire great performance in slideshow when they present. They want the animations to look as smooth as the ones they see on television. In order to do this, the PowerPoint® presentation program uses hardware graphics acceleration provided by the Direct3D® driver library. Unfortunately, because some video cards support certain graphics features, while others do not, when the application software tries to use them, they do not work properly. For example, some cards crash or hang on certain function calls. Obviously, it is extremely important for the slideshow feature to work reliably. If a game crashes, the user can reboot and start again without much issue. However, if a slideshow crashes it is another matter. For example, if a salesperson is giving a presentation to a large group of people and the slideshow crashes, the audience may consider the presenter incompetent.

SUMMARY

The present invention overcomes the aforementioned limitations in prior computer software and hardware systems by a system and method that seeks to get the best software application performance and reliability by optimizing the application software, such as PowerPoint®, for the capabilities of specific video hardware. This system and method encompasses a procedure that validates the different functions of a 3D acceleration capable video card, decides whether to use the acceleration hardware and optimizes the software application to selectively use the functions that work on the specific video acceleration card. This procedure is typically run every time just as the application software initializes. The invention can be couched in the terms of use with a graphics presentation program, such as PowerPoint®, and a graphics accelerator driver database such as Direct3D®. However, those with ordinary skill in the art will realize that the system and method according to the present invention could be used with any graphics intensive application program that employs the use of graphics acceleration hardware in combination with any graphics driver library.

By way of example, a software application, such as PowerPoint®, typically interfaces with a 3D graphics accelerator via a driver library such as Direct3D® to more efficiently process graphics displays. In the case of the PowerPoint® software application, a slideshow module is included which presents the "slides" in the user's presentation as a cohesive package. This slideshow module interfaces with a drawing layer that provides drawing commands to display these slides on a computer monitor or other display device. The drawing layer can interface with the Central Processing Unit (CPU) of the user's computer either via a software renderer to provide the drawing commands, or can interface with a graphics accelerator renderer, such as the Direct3D® renderer, which interfaces with the graphics accelerator to draw the respective drawings.

The graphics accelerator renderer, which typically resides in the application software, interfaces with the graphics accelerator hardware and software through a drawer, which converts drawing layer commands to graphics accelerator commands (in this case Direct3D® commands). Additionally, the graphics accelerator renderer initializes the graphics accelerator hardware and software via an initialization module for compatibility testing of the graphics acceleration functions and determining which functions are to be utilized with the application software. The present invention automatically performs compatibility testing with the graphics acceleration hardware and software as part of the initialization process. It should be noted that it is typically desirable to use the graphics accelerator hardware rather than the software with this invention, since this hardware processes 3D data much more quickly than either the software resident in the graphics accelerator or the software renderer that interfaces with the system's CPU. The test module also interfaces with a drawer and texture manager for the purpose of performing the aforementioned compatibility testing of the graphics acceleration hardware of the video card.

In the most general sense, the invention performs compatibility testing of the graphics hardware by first checking to see if graphics acceleration is selected or enabled, checking if the video card is on a list of cards with known problems, and verifying that a graphics acceleration driver library initializes the graphics accelerator successfully. The invention also checks to see if sufficient video memory is available to perform the various compatibility tests and verifies that calls to the video card hardware are successful. In each of these process actions if the particular process action indicates that there is a problem with the compatibility of the video card and the application software the decision is made not to use the graphics acceleration hardware of the video card. Additionally, if the above process actions indicate no compatibility problems exist, the options to be used with the video card are selected and stored. Then sub-pixel positioning is tested. If this test is successful, then pixel offset values are stored. If the test is not successful, the decision is made not to use graphics acceleration hardware of the video card. A test is then conducted to determine whether the opacity function performs correctly when used with the graphics accelerator. Again, if the opacity function does not work correctly then the procedure is exited with a determination not to use graphics acceleration. If the opacity test is passed, however, a test is conducted for color replacement. If this test does not pass, another test wherein a fog function is used to perform color replacement is conducted, and if this test also does not pass then the decision is again made not to use graphics acceleration. If the color replacement test passes, then the decision is made to use graphics acceleration, and the system and method according to the present invention continues to run the application software. Those with ordinary skill in the art will realize that it is not necessary to perform all of the above tests in a specific order. Additionally, other types of tests could be performed to ensure software application and video card hardware compatibility before the software application is used to render 3D graphics.

By way of example, the software program, in this case PowerPoint®, typically initially examines whether the user has turned off the hardware graphics acceleration option. To this end, a graphical user interface may be made available to the user to disable the graphics acceleration option. If the user chooses to disable the graphics acceleration option, a flag is set in the software. The application software may also set this flag if a previous attempt to graphics acceleration fails. The application software may then examine whether this flag is set in the software. If so, the system and method according to the present invention determines that the graphics acceleration hardware of the video card is not to be used, and exits the procedure. If the user or software has not turned off the hardware graphics acceleration option of the software, the system continues to examine the feasibility of using the graphics acceleration hardware of the video card.

In one embodiment, the software application then examines whether the video card resident in the user's computer hardware is on a list of cards that is known to be incompatible with the software program. This may be performed by the application software by maintaining a database of video cards and/or video drivers known to be incompatible with the software and checking to see if the video card and/or video driver resident in the user's computer is in the database. If the card and/or driver is determined to be incompatible with the application software by this action, the application software does not use the graphics acceleration hardware, and exits the procedure.

The application software then attempts to initialize the graphics acceleration hardware by setting up the drawer in the application software, ensuring it loads successfully and making calls to it. If the initialization is unsuccessful, the system determines that the graphics acceleration hardware is not to be used and exits the procedure. If the initialization is successful, the video memory of on-screen and off-screen buffers of the video card is then checked by requesting the video memory for them. If this call is unsuccessful the decision is made not to use the graphics acceleration hardware. If the call is successful then the system continues its checks.

The system then requests to access the video card hardware through the hardware abstraction layer (HAL). The HAL is a software interface to various 3D features of the video card. If the hardware device cannot be accessed, the decision is made not to use the graphics acceleration hardware. If access to the graphics acceleration hardware is successful, the system and method according to the present invention proceeds to set the graphics acceleration options necessary to support the application software. These options are saved in memory and accessed as the application software runs. Such options include, for example, how textures are to be drawn and the selection of various filtering options.

The system then checks if there is sufficient video memory to perform the remainder of the compatibility tests between the application software and the graphics hardware. During these tests, test patterns and computations are written to off-screen video memory. Hence, both the on-screen and off-screen buffers are used. To draw the test patterns and to perform the applicable calculations of the present invention, there typically must be enough video memory for the on-screen and off-screen buffers plus the number of textures used in the compatibility tests (in a tested embodiment this was 8 textures of size 128×128 pixels).

The system then creates a texture, filling it with a test pattern. The test pattern preferably consists of a black background and diagonal line of pixels of all white color except the first three pixels which are red, green and blue. This test pattern is typically drawn to the off-screen buffer at position 1,1.

Next the sub-pixel positioning is tested. Sub-pixel positioning is important to presentation software, such as Power-Point®, because the clarity of text on the computer screen is critical to the readability of the presentation. In general, this sub-pixel positioning test consists of 1) drawing the test image to off-screen video memory; 2) determining where the pixels for the test image were drawn using the expected pixel boundary and color; 3) calculating the offset values between where the pixels were expected to be drawn and where they were actually drawn; and 4) determining whether the offset values are acceptable to correct for this offset during 3D graphics rendering. If the offset values are, not acceptable, different offset values may be tried until the offset values are below some predetermined threshold. This process may be repeated for more than one cycle.

Specifically, for the test conducted by the system and method according to the present invention, the test pattern is preferably drawn to off-screen video memory and it is assumed that the center of a test pixel is at 0.5, 0.5 (further assuming a pixel matrix of 128×128 pixels and having an origin of 0,0). The pixel values of the test pixel are then read back from the off-screen video memory. If the values match what is expected (i.e, the values are below a given threshold) then this sub-pixel positioning is used (stored in memory to correct for pixel position during the application run time). That is, if the difference in colors from what is expected and what is read from the screen buffer is less than the threshold, then this sub-pixel positioning is used. One exemplary formula that may be used for this purpose is (abs(r_actual−r_expected)+abs(g_actual−g_expected)+abs(b_actual−b_expected)), where r, g and b represent the pixel colors of red, green and blue, respectively. For example, using a threshold of 24, if a RGB color of (255,0,0) is expected and an actual color of (250,1,0) is read, then the difference in colors between the actual and expected values is 6 so this sub-pixel positioning is accepted. If the read values do not match (i.e., the values are over the threshold), then other pixel offset values are tried in an attempt to determine the actual pixel offset until a match is found. This process may be repeated for a number of cycles or iterations. In a tested embodiment four cycles were completed, using expected pixel offset values of 0.5+1/16, 0, 0+1/16 and 0.5 from the origin of each pixel center as drawn to offscreen video memory by the graphics hardware.

If the difference in value between the expected pixel color and the read pixel colors is greater than the threshold (i.e., 24) for all desired cycles using different off-set values, then the minimization filter and maximization filters are turned off and the desired number (e.g., four) of cycles of the above process is repeated again. The maximization filter is used when an image is being increased in size. It uses interpolation between pixels so the image looks smooth (usually bilinear filtering). The minimization filter is used when the image is decreased in size. It also uses interpolation but typically uses a different algorithm than the maximization filter. If turning off these filters still does not bring the difference between the expected pixel color and the read pixel values under the threshold then the determination is made not to use graphics acceleration as the resultant sub-pixel positioning will result in noticeable distortion or blurring of the 3D image.

If the sub-pixel positioning is determined to be suitable, the system and method according to the present invention then tests to see if the graphics acceleration hardware can perform the opacity function. This is done by setting the opacity of a pixel to a prescribed value such as 50%. The color value of the pixel is then read from the screen buffer. If the color has not changed then it is assumed that the card cannot perform the opacity function and graphics acceleration is not used The color replacement function is then tested. Several conventional 3D acceleration techniques can be used for this purpose. One of these techniques tests color replacement by replacing all of the color in a texture by another color without changing the opacity values. For example, a texture is drawn in red by telling the video card to use Diffuse Color for the texture and to ignore the original color of the texture. The color of the pixels is then read. If the color is not as expected then an attempt is made to determine whether a fog function can be used to mimic the opacity function. If this fails, then graphics acceleration function is not used. However, if all of the above steps were successful then the hardware graphics acceleration function is used.

Even with the above-specified compatibility tests, there is a chance that the hardware will fail. To mitigate this possibility, the present invention automatically disables graphics acceleration if the graphics accelerator hardware crashes or hangs during the running of the software application. The next time the user launches application software, slideshow in the case of PowerPoint® application software, it does not crash. To do this, a flag is set when slideshow is started and unset it once the slideshow successfully ends. However, if slideshow does not successfully end then the flag is not unset. The next time slideshow is launched, the program notes that the flag is set and graphics acceleration is not used.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
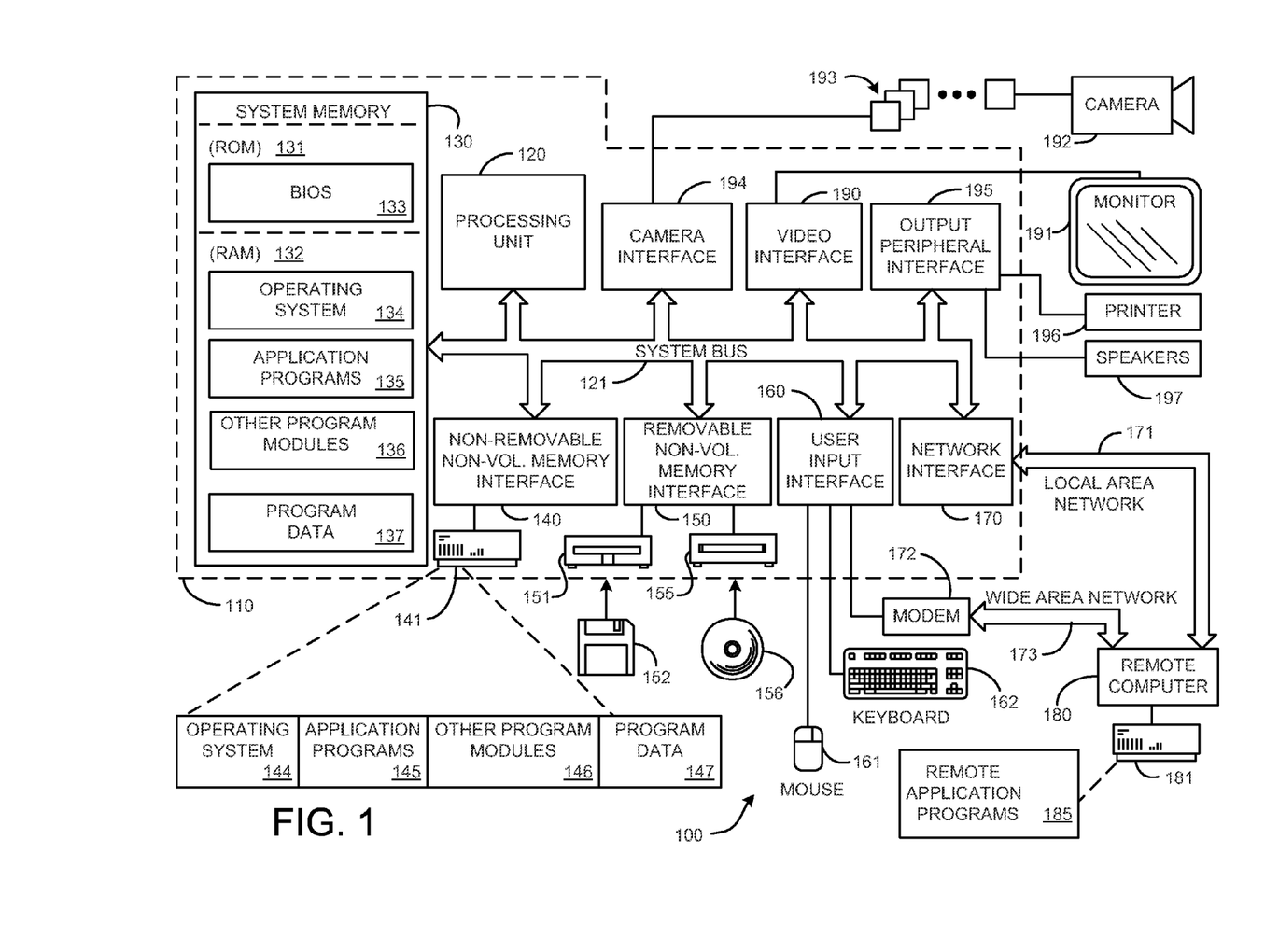
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

The present invention provides a system and method that optimizes application software, such as PowerPoint®, for the capabilities of specific video hardware, thereby improving software performance and reliability. This system and method validates the different functions of a 3D acceleration capable video card, decides whether to use graphics acceleration hardware and optimizes the software application to selectively use the functions that work on the specific video acceleration card. This procedure is typically run every time just as the application software initializes. The invention can be couched in the terms of use with a graphics presentation program, such as PowerPoint®, and a driver database such as Direct3D®. However, those with ordinary skill in the art will realize that the system and method according to the present invention could be used with any graphics intensive application program that employs the use of graphics acceleration hardware in combination with any graphics driver library.

Figure 2:
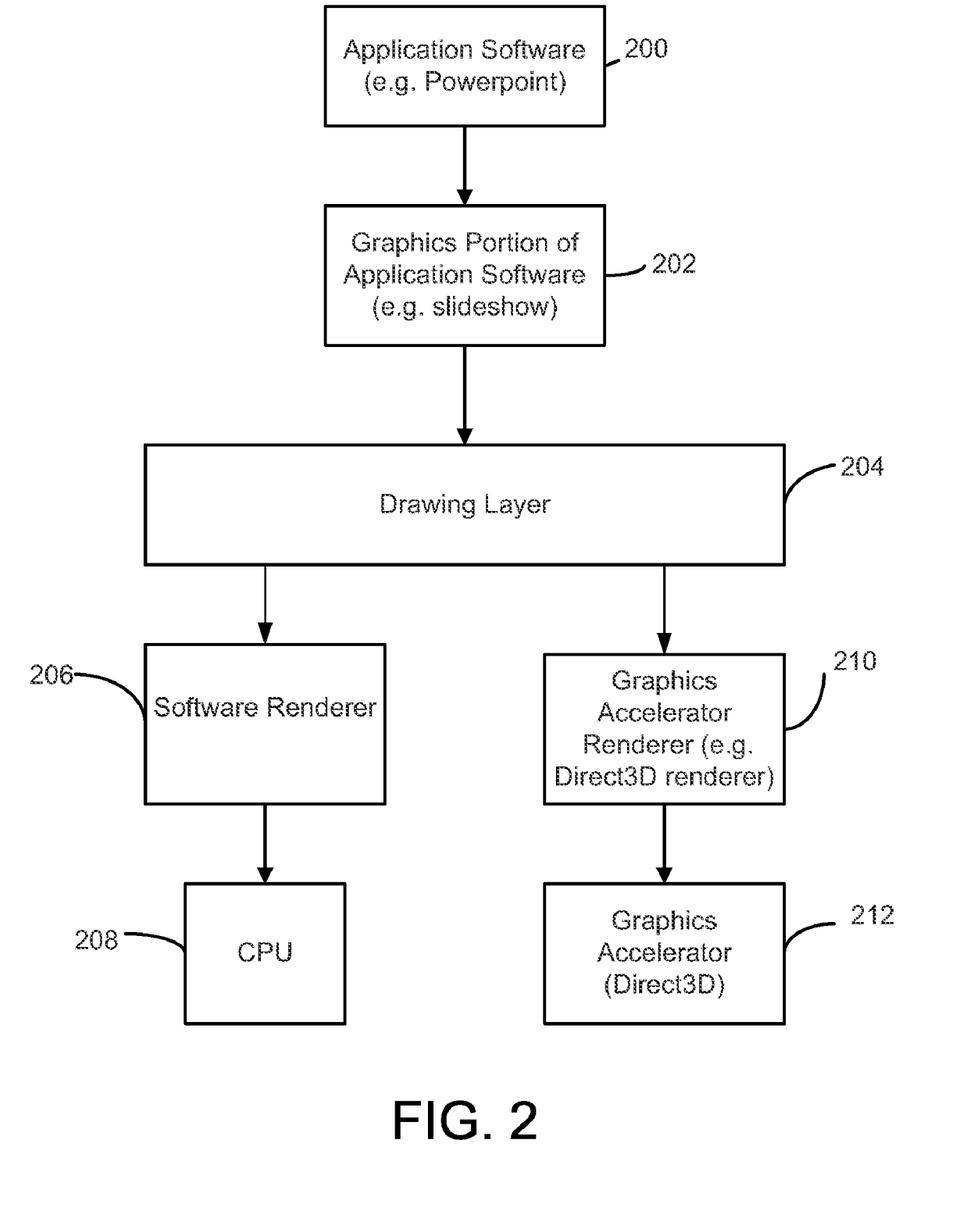
FIG. 2 is a schematic of how an application program interfaces with a 3D accelerator.

By way of example, FIG. 2 provides a general system schematic of how a software application 200, such as PowerPoint®, typically interfaces with a 3D graphics accelerator. In this case, the PowerPoint® software application includes a slideshow module 202 which presents the "slides" in the user's presentation as a cohesive package. This slideshow module 202 interfaces with a drawing layer 204 that provides drawing commands to display the aforementioned slides on a computer monitor or other display device. The drawing layer can either interface (typically via a software renderer 206) with the Central Processing Unit (CPU) 208 of the user's computer to provide the drawing commands, or interface with a graphics accelerator renderer 210 which interfaces with the graphics accelerator 212, such as Direct3D®, to draw the respective drawings.

Figure 3:
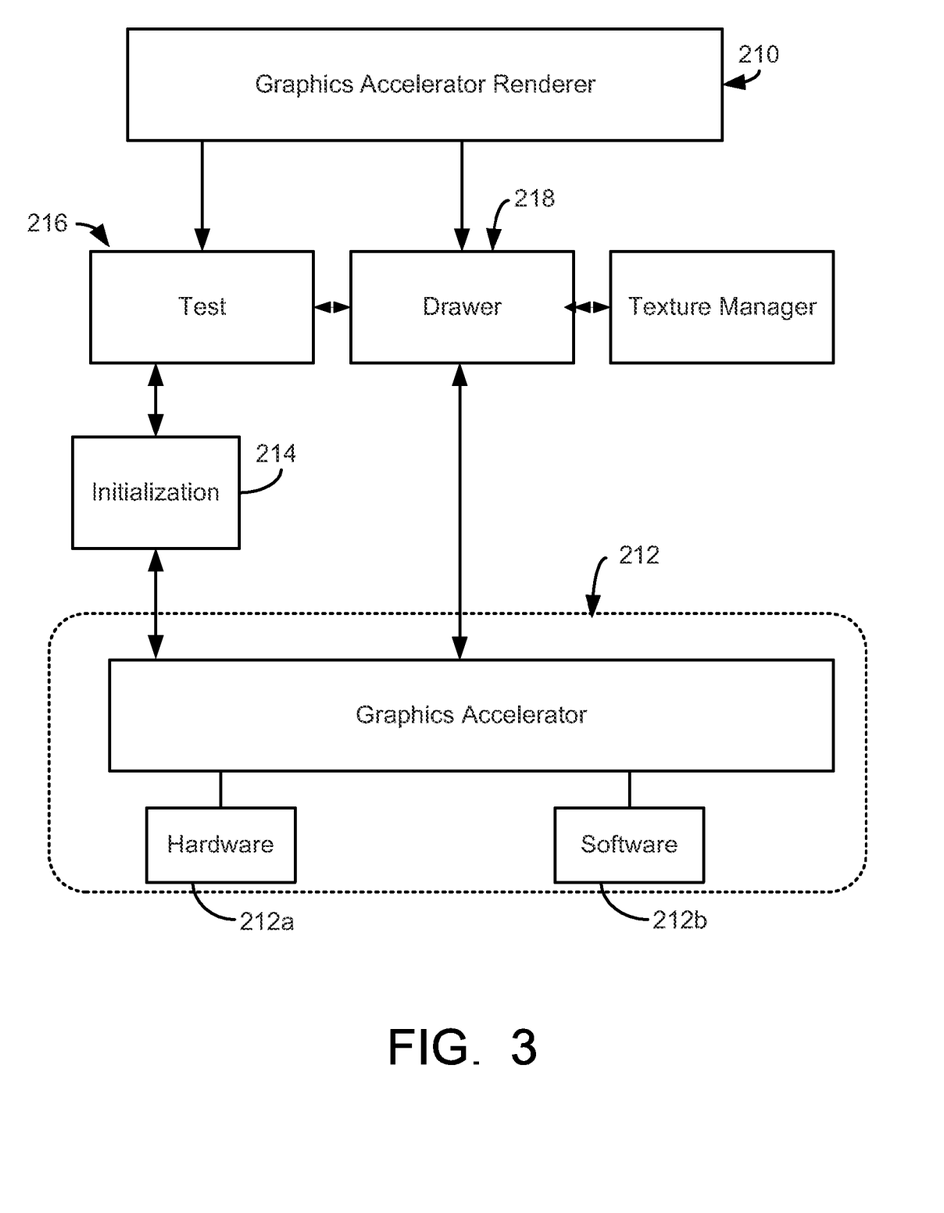
FIG. 3 is a schematic of how the 3D software renderer interfaces with the graphics accelerator hardware and software.

Referring now to FIG. 3, the graphics accelerator renderer 210, which typically resides in the application software, interfaces with the graphics accelerator hardware 212a and software 212b through a drawer 218, which converts drawing layer commands to graphics accelerator commands (in this case Direct3D® commands). Additionally, the graphics accelerator renderer 210 initializes the graphics accelerator 212 hardware and software, via an initialization module 214 for compatibility testing of graphics acceleration functions and determining which functions are to be utilized with the application software. The present invention automatically performs this compatibility testing with the graphics acceleration hardware 212a and software 212b via a test module 216 as part of an initialization process. It should be noted that it is typically desirable to use the graphics accelerator hardware 212a with this invention rather than the software 212b, since this hardware processes 3D data much more efficiently than either the software resident in the graphics accelerator or the software renderer that interfaces with the system's CPU. The test module 216 also interfaces with a drawer and texture manager for the purpose of performing the aforementioned compatibility testing of the graphics acceleration hardware of the video card.

Figure 4A:
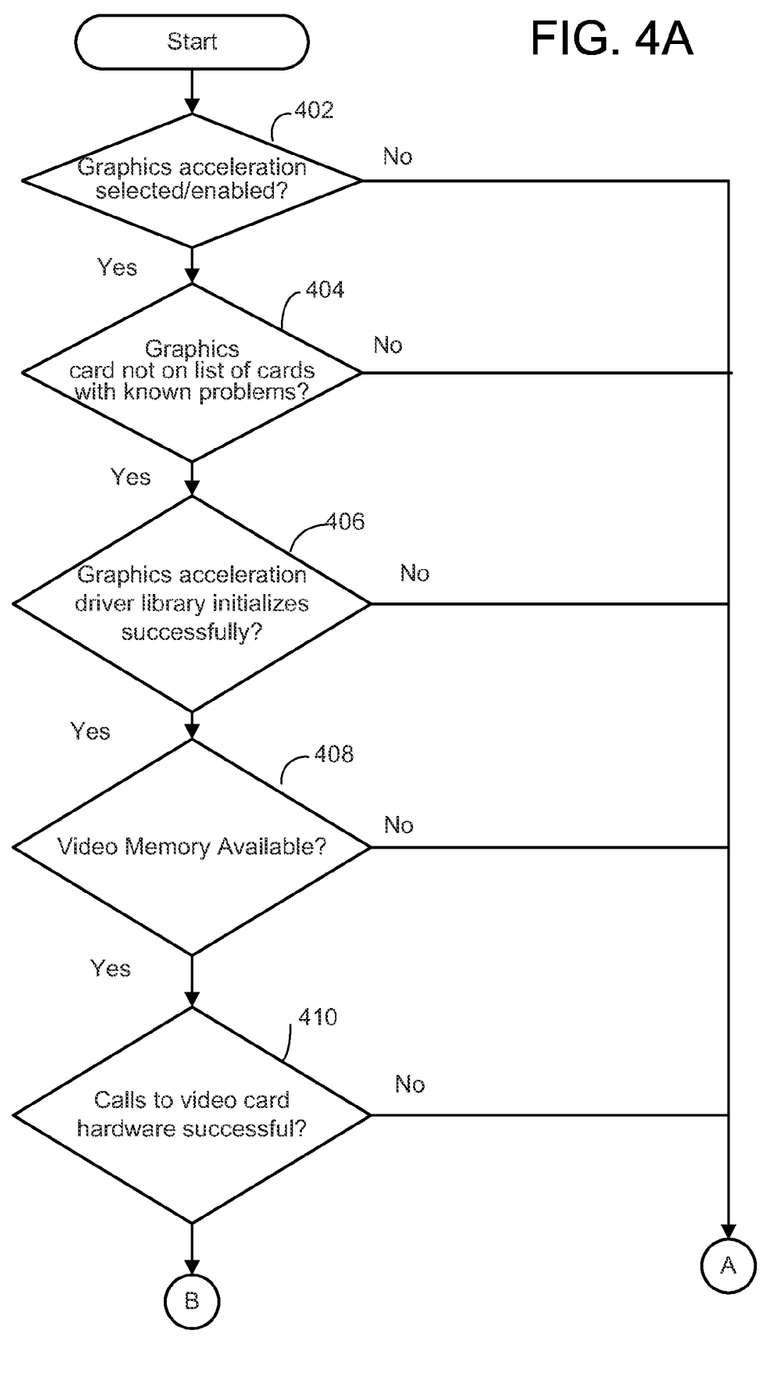
FIG. 4A is a flow chart showing the general process actions of the present invention.
Figure 4B:
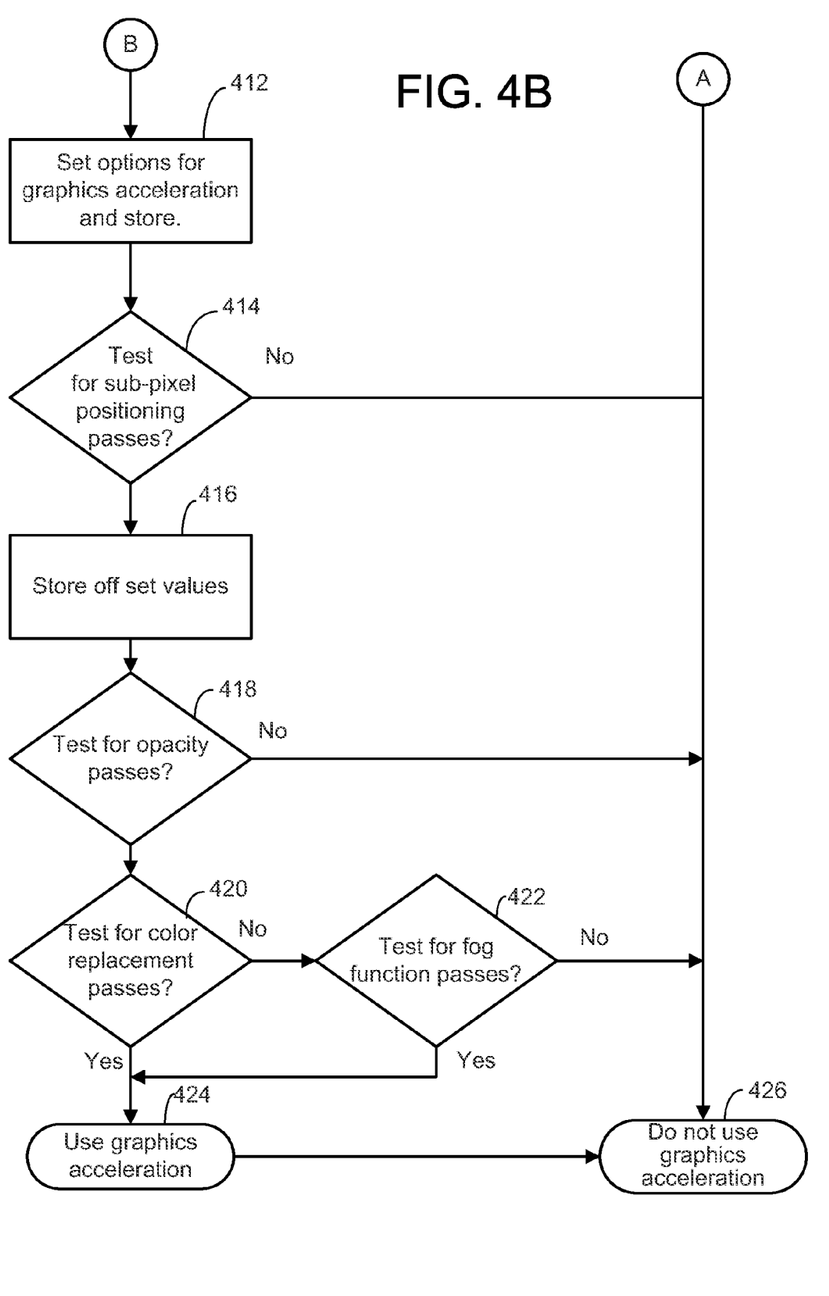
FIG. 4B is a continuation of the flowchart depicted in FIG. 4A.

In the most general sense, as shown in FIGS. 4A and 4B, the invention performs compatibility testing of the graphics hardware by first checking to see if graphics acceleration is selected or enabled (process action 402), checking to see if the video card is on a list of cards with known problems (process action 404), and verifying that the graphics accelerator driver library initializes the graphics acceleration hardware of the video card successfully (process action 406). The invention also checks to see if sufficient video memory is available to perform the various remaining compatibility tests (process action 408) and verifies that calls to the video card hardware are successful (process action 410). In each of these process actions if the particular process action indicates that there is a problem with the compatibility of the video card and the application software the decision is made not to use the graphics acceleration hardware of the video card (process action 426). Additionally, if the above process actions indicate no compatibility problems, the options to be used with the video card are selected and stored (process action 412), as shown in FIG. 4B. Then sub-pixel positioning, which is described in more detail below, is tested (process action 414). If this test is successful, then pixel offset values are stored (process action 416). If the test is not successful, the decision is made not to use graphics acceleration (process action 426). A test is then conducted to determine whether the opacity function performs correctly when used with the graphics accelerator (process action 418). Again, if the opacity function does not work correctly then the procedure is exited with a determination not to use the graphics acceleration hardware of the video card (process action 426). If the opacity test is passed, however, a test is conducted for color replacement (process action 420). If the color replacement test does not pass, another test wherein a fog function is used to perform color replacement is conducted (process action 422), and if this test also does not pass then the decision is made not to use graphics acceleration (process action 426). If the initial color replacement test (process action 420) passes, then the decision is again made to use graphics acceleration (process action 424), and the system and method according to the present invention continues to run the application software. Those with ordinary skill in the art will realize that it is not necessary to perform all of the above process actions in a specific order. Additionally, other types of tests could be performed to ensure software application and video card hardware compatibility before the software application is used to render 3D graphics.

Figure 5A:
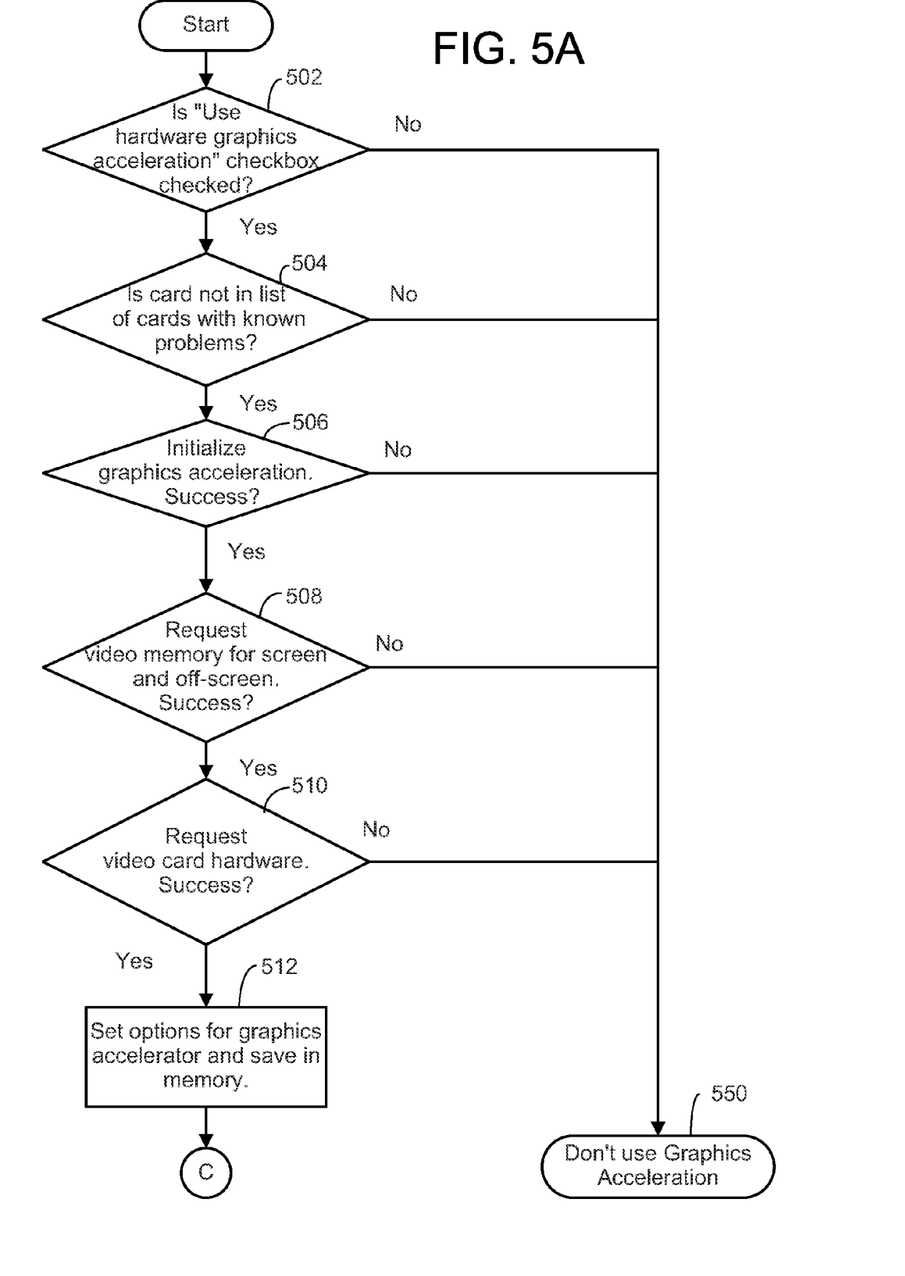
FIG. 5A is a flow chart showing the process actions of the present invention in more detail.
Figure 6:
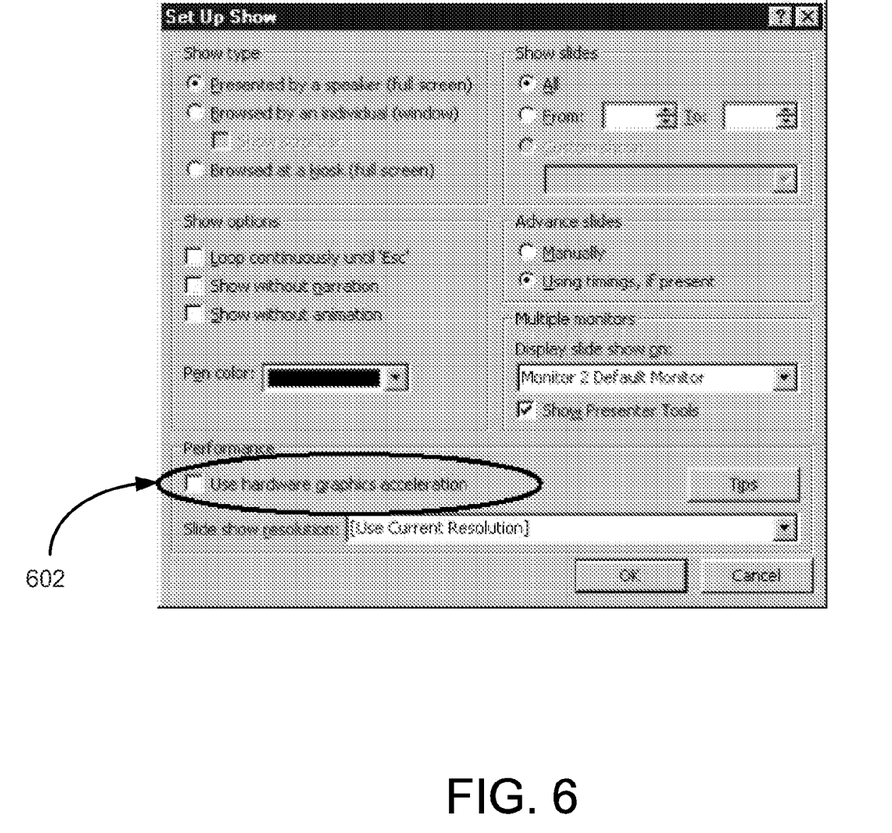
FIG. 6 is an exemplary graphics user interface for the system and method according to the present invention.

For a more detailed discussion of the various tests performed to determine the compatibility between the application software and the graphics acceleration hardware of the video card, FIG. 5A is referred to. To begin with, the software program, such as PowerPoint®, typically initially examines whether the user has turned off the hardware graphics acceleration option or the software has previously disabled the option based on a previous failed attempt to use graphics acceleration, as shown in process action 502. To this end, a graphical user interface, as shown in FIG. 6, may be made available to the user to disable the graphics acceleration option by checking a box 602 with a computer input device, thereby setting a flag in the software. The application software may also set this flag if a previous attempt to use graphics acceleration fails, as will be discussed in further detail later. The software then examines whether this flag is set in the software. If so, the system and method according to the present invention determines that the graphics acceleration hardware is not to be used, and exits the procedure (process action 550). If the user has not turned off the hardware graphics acceleration option of the software, the system continues to examine the feasibility of using the graphics acceleration hardware of the video card as described below.

In addition, in one embodiment, the invention then examines whether the video card resident in the user's computer hardware is on a list of cards that is known to be incompatible when used with the software program, as shown in process action 504. This test is performed by the application software by maintaining a database of video cards and/or video card drivers that are known to be incompatible with the application software and checking to see if the video card and/or video card drivers resident in the user's computer is in the database. If the card or driver is determined to be incompatible with the software by this procedure, the present invention does not use the graphics acceleration hardware of the video card, and exits the testing steps (process action 550).

The system and method according to the present invention then attempts to initialize the graphics acceleration functionality by initializing a drawer in the application software, ensuring it loads successfully and making calls to it (process action 506). If the initialization is unsuccessful, the system determines that the graphics acceleration hardware of the video card is not to be used and exits the procedure (process action 550). If the initialization is successful, the system and method according to the present invention proceeds to check the video memory of on-screen and off-screen buffers of the video card by requesting the video memory for them (process action 508). If this call is unsuccessful the decision is made not to use the graphics acceleration hardware (process action 550). If the call is successful, the system continues its checks.

As shown in process action 510, the system then requests to access the video card hardware through the hardware abstraction layer (HAL). The HAL is a software interface to various 3D features of the video card. If the hardware device cannot be accessed, the decision is made not to use the graphics acceleration hardware (process action 550). If access to the graphics acceleration hardware is successful, the system and method according to the present invention proceeds to set the graphics acceleration options necessary to support the application software (process action 512). These options are saved in memory and accessed as the application software runs. Such options include, for example, how textures are to be drawn and the selection of various filtering options.

Figure 5B:
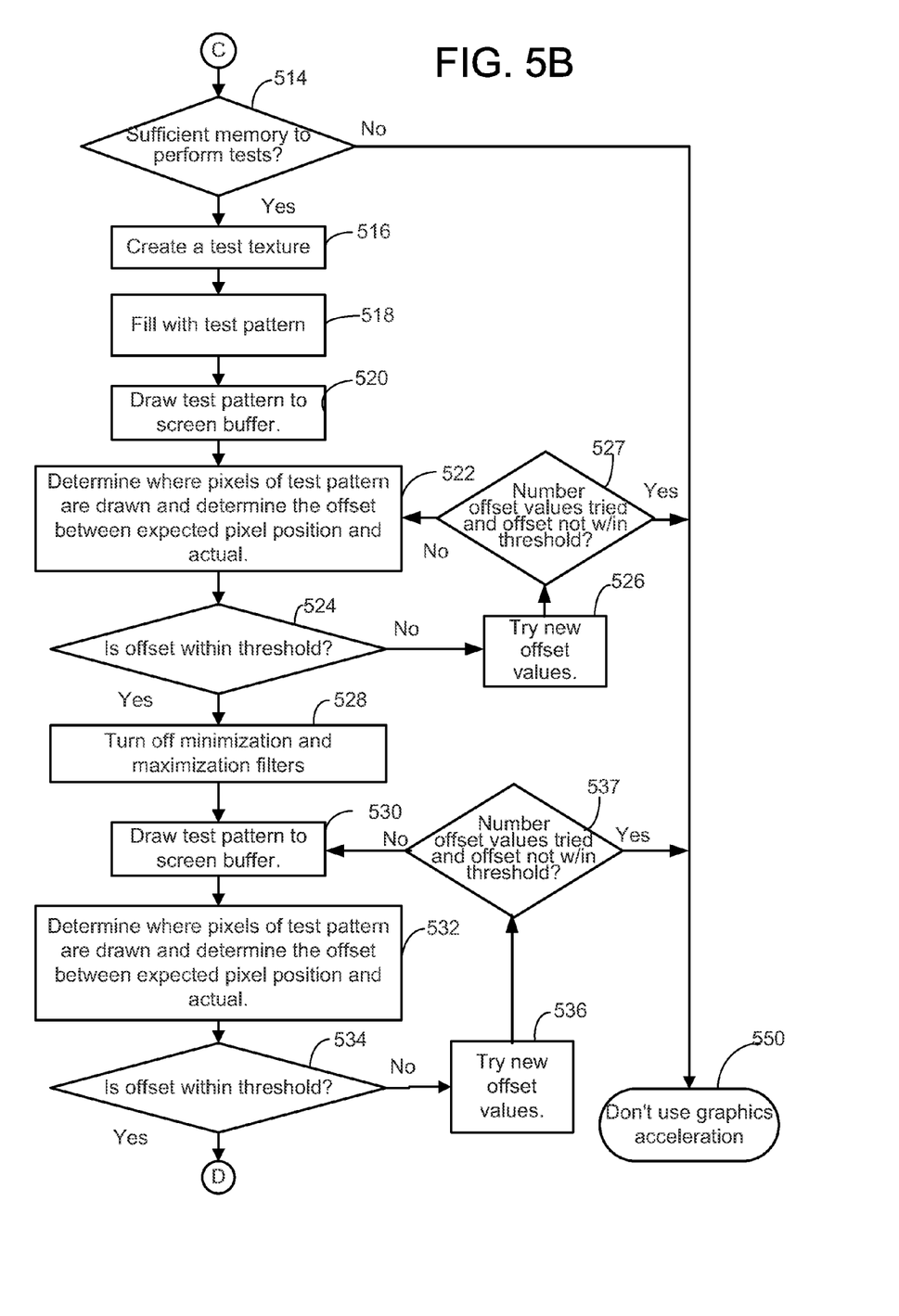
FIG. 5B is continuation of the flowchart shown in FIG. 5A.

As shown in FIG. 5B, the system then checks if there is sufficient video memory to perform the remainder of the compatibility tests between the application software and the graphics hardware (process action 514). During these tests, test patterns and computations are written to off-screen video memory. Hence, both the on-screen and off-screen buffers are used. Using dual buffers is a known graphics technique for delaying the effect of graphics operations, typically implemented by rendering graphics operations into an off-screen buffer. The contents of the buffer are then copied to the screen in a single operation. To draw the test patterns and to perform the applicable calculations of the present invention, there typically must be enough video memory for the on-screen and off-screen buffers plus the number of textures used in the compatibility tests (in a tested embodiment this was eight textures of size 128×128 pixels).

The system and method according to the present invention then creates a texture (process action 516) and fills it with a test pattern (process action 518). The test pattern preferably consists of a black background and diagonal line of pixels of all white color except the first three pixels which are red, green and blue. This test pattern is typically drawn to the off-screen buffer at position 1,1 (process action 522).

Next the sub-pixel positioning is tested. Like most computer graphic imaging applications, PowerPoint®, which was used in a tested embodiment of the present invention, offers "sub-pixel positioning" to achieve smooth movement in any transformation of displayed images or graphics. Sub-pixel positioning refers to the ability to "move" an image less than one pixel's distance. Sub-pixel positioning is essential because of the eye's ability to detect even the slightest jump or inconsistency in motion. Due to the "finite" amount of pixels in an image (e.g. 720 horizontal pixels in video), fine detail often becomes "soft" (e.g. not as fine) when the image is moved or rotated. Sub-pixel positioning is critical to presentation software, such as PowerPoint®, because the clarity of text on the computer screen is critical to the readability of the presentation.

In general, this sub-pixel positioning test consists of 1) drawing the test image to off-screen video memory (process action 520); 2) determining where the pixels for the test image were drawn using the expected pixel boundary and color (process action 522); 3) calculating the offset values between where the pixels were expected to be drawn and where they were actually drawn (process action 522); and 4) determining whether the offset values are acceptable to correct for this offset during 3D graphics rendering (process action 524). If the offset values are not acceptable, different offset values may be tried until the offset values are below the predetermined threshold (as shown in process actions 526 and 527).

Specifically, the test pattern is preferably drawn to off-screen video memory and it is assumed that the center of a test pixel is at 0.5, 0.5 (further assuming a pixel matrix of 128× 128 pixels and having an origin of 0,0). The pixel values of the test pixel are then read back from the off-screen video memory. If the values match what is expected (i.e, the values are below a given threshold) then this sub-pixel positioning is used (stored in memory to correct for pixel position during the application run time). That is, if the difference in pixel colors from what is expected and what is read from the screen buffer is less than the threshold, then this sub-pixel positioning is used. One exemplary formula that may be used for this purpose is $(abs(r\_actual-r\_expected)+abs(g\_actual-g\_expected)+abs(b\_actual-b\_expected))$, where r_actual represents the amount of red in the actual pixel color, r_expected represents the amount of red in the expected pixel color, where g_actual represents the amount of green in the actual pixel color, g_expected represents the amount of green in the expected pixel color, and where b_actual represents the amount of blue in the actual pixel color, b_expected represents the amount of blue in the expected pixel color. For example, using a threshold of 24, if a RGB color of (255,0,0) is expected and an actual color of (250,1,0) is read, then the difference in colors between the actual and expected values is 6 so this sub-pixel positioning is accepted. If the read values do not match (i.e., the values are over the threshold) then other pixel offset values are tried in an attempt to determine the actual pixel offset until a match is found. This process may be repeated for a number of cycles. In a tested embodiment four cycles were completed using pixel offset values of $0.5+\frac{1}{16}$, 0, $0+\frac{1}{16}$, and 0.5 from the origin of each pixel as drawn to the offscreen video memory by the graphics hardware.

If the difference in value between the expected pixel color and the read pixel colors is greater than the threshold (e.g., 24, in the above example) for all (e.g., four) cycles using different offset values, then the minimization filter and maximization filters are turned off (process action 528) and additional cycles (e.g., four) of the above process are repeated again, as shown in process actions 530 to 537. If this still does not bring the difference between the expected pixel color and the read pixel values under the threshold then the determination is made not to use the graphics acceleration as the resultant sub-pixel positioning will result in noticeable distortion or blurring of the 3D image (process action 550).

Figure 5C:
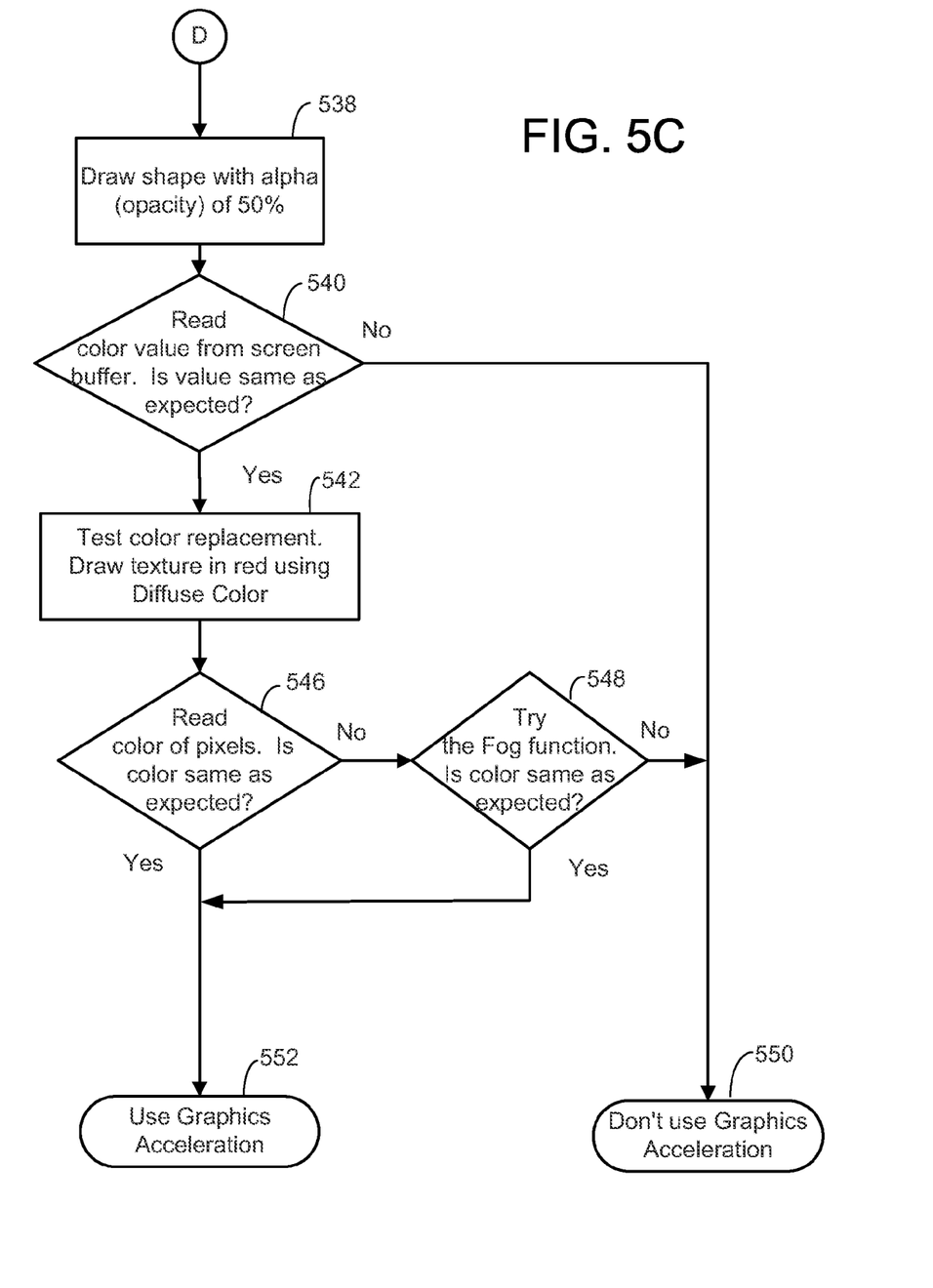
FIG. 5C is a continuation of the flowchart shown in FIG. 5B.

As shown in FIG. 5C, if the sub-pixel positioning is determined to be suitable, the system and method according to the present invention then tests to see if the graphics acceleration hardware can perform the opacity function. This is typically done by drawing a shape while setting the opacity of a pixel to a prescribed value such as 50% (process action 538). The color value of the pixel is then read from the screen buffer (process action 540). If the color has not changed then it is assumed that the card cannot perform the opacity function and graphics acceleration is not used (process action 550).

The color replacement function is then tested. Several conventional 3D acceleration techniques can be used for this purpose. One of these techniques tests color replacement by replacing all of the color in a texture by another color without changing the opacity values. For example, a texture is drawn in red by telling the card to use Diffuse Color for the texture and to ignore the original color of the texture (process action 542). The color of the pixels is then read (process action 546). If the color is not as expected then an attempt is made to determine whether a fog function can be used to mimic the color replacement function (process action 548). If this fails, then graphics acceleration function is not used (process action 550). However, if all of the above steps were successful then the hardware graphics acceleration function is used (process action 552).

Even with the above-specified compatibility tests, there is a chance that the hardware will fail. To mitigate this possibility, the present invention automatically disables graphics acceleration if the graphics accelerator hardware crashes or hangs during the running of the software application. The next time the user launches application software, slideshow in the case of PowerPoint® application software, it does not crash. To do this, a flag is set when slideshow is started and unset it once the slideshow successfully ends. However, if slideshow does not successfully end then the flag is not unset. The next time slideshow is launched, the program notes that the flag is set and graphics acceleration is not used.

While the invention has been described in detail by specific reference to preferred embodiments thereof, it is understood that variations and modifications thereof may be made without departing from the true spirit and scope of the invention. For example, the system and method described above is not limited to the specific tests discussed herein. Other graphics acceleration functions could be tested like multi-texturing, colored lighting, texture size restrictions, and any other hardware features that are used Wherefore, having thus described the present invention, what is claimed is:

1. A computer-implemented process for optimizing the performance of a software application while using graphics acceleration hardware comprising the process actions of:
   receiving an indication in a user interface of the software application, the indication specifying whether graphics acceleration hardware is to be used with the software application or not;
   in response to a positive indication, wherein a positive indication indicates graphics acceleration hardware is to be used, specifying use of the graphics acceleration hardware, determining whether the graphics acceleration hardware exists in a computer system;
   in response to determining the graphics acceleration hardware does not exist in the computer system, ignoring the positive indication;
   in response to determining the graphics acceleration hardware does exist in the computer system, establishing a utilization of the graphics acceleration hardware by the software application; and
   automatically using the graphics acceleration hardware to generate output for the software application.

2. The computer-implemented process of claim 1 wherein the indicator to use graphics acceleration hardware is displayed on a display of the computer system.

3. The computer-implemented process of claim 2, wherein a user can change the indication.

4. The computer-implemented process of claim 2, wherein the indication is via a checkbox.

5. The computer-implemented process of claim 1, wherein the software application is an office productivity application.

6. The computer-implemented process of claim 5, wherein the software application is a photo-editing application.

7. The computer-implemented process of claim 1 wherein the output is optimized when the graphics acceleration hardware is automatically used to generate output for the software application.

8. A computer-readable storage medium having computer executable instructions stored thereon for optimizing the performance of a graphics intensive software application while using graphics acceleration hardware of a video card comprising, said computer executable instructions comprising:
   receiving an indication in a user interface of the software application, the indication specifying whether graphics acceleration hardware of the video card is to be used by the software application or not;
   in response to a positive indication, wherein a positive indication indicates graphics acceleration hardware is to be used, specifying use of the graphics acceleration hardware, determining whether the graphics acceleration hardware exists in a computer system;
   in response to determining the graphics acceleration hardware does not exist in the computer system, ignoring the positive indication;
   in response to determining the graphics acceleration hardware does exist in the computer system, establishing a utilization of the graphics acceleration hardware by the software application; and
   automatically using the graphics acceleration hardware to generate output for the software application.

9. The computer-implemented process of claim 8 wherein the indication is displayed on a display of the computer system.

10. The computer-implemented process of claim 9 wherein a user can change the indication.

11. The computer-implemented process of claim 8 wherein the indication is via a checkbox.

12. The computer-implemented process of claim 1 wherein the software application is an office productivity application.

13. A system for optimizing the performance of an office productivity software application while using graphics acceleration hardware comprising:
   a general purpose computing device;
   a computer program comprising program modules executable by the general purpose computing device, wherein the computing device is directed by the program modules of the computer program to,
   receive an indication in a user interface of the software application, the indication specifying whether graphics acceleration hardware is to be used by the software application or not;
   in response to a positive indication, wherein a positive indication indicates graphics acceleration hardware is to be used, specifying use of the graphics acceleration hardware, determine whether the graphics acceleration hardware exists in a computer system;
   in response to determining the graphics acceleration hardware does not exist in the computer system, ignore the positive indication;
   in response to determining the graphics acceleration hardware does exist in the computer system, establish a utilization of the graphics acceleration hardware by the software application; and
   automatically use the graphics acceleration hardware to generate output for the software application.

14. The system of claim 13 wherein the indication is displayed on a display of the computer system.

15. The system of claim 13 wherein a user can change the indication.

16. The system of claim 13 wherein the indication is via a checkbox.

17. The system of claim 13 wherein the software application is an office productivity application.

18. The system of claim 17 wherein the office productivity application is a presentation application.

19. The system of claim 17 wherein the office productivity application is a word processing application.

20. The system of claim 13 wherein the output is optimized when the graphics acceleration hardware is automatically used to generate output for the software application.

* * * * *